United States Patent
Chung et al.

(10) Patent No.: US 12,462,666 B2
(45) Date of Patent: Nov. 4, 2025

(54) TRACKING PERSONAL ITEMS VIA LAUNDRY APPLIANCES RESERVATION SYSTEM

(71) Applicant: Haier US Appliance Solutions, Inc., Wilmington, DE (US)

(72) Inventors: MyungGeon Chung, Seoul (KR); Keenan Gizzi, Black Mountain, NC (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 105 days.

(21) Appl. No.: 18/487,650

(22) Filed: Oct. 16, 2023

(65) Prior Publication Data

US 2025/0124778 A1    Apr. 17, 2025

(51) Int. Cl.
| | |
|---|---|
| *G08B 21/24* | (2006.01) |
| *D06F 34/05* | (2020.01) |
| *D06F 58/32* | (2020.01) |
| *G06Q 10/02* | (2012.01) |
| *G06Q 30/0207* | (2023.01) |
| *D06F 105/58* | (2020.01) |

(52) U.S. Cl.
CPC ............ *G08B 21/24* (2013.01); *D06F 34/05* (2020.02); *D06F 58/32* (2020.02); *G06Q 10/02* (2013.01); *G06Q 30/0207* (2013.01); *D06F 2105/58* (2020.02)

(58) Field of Classification Search
CPC ......... G08B 21/24; D06F 58/32; D06F 34/05; D06F 2105/58; G06Q 10/02; G06Q 30/0207
USPC .................................................. 340/539.32
See application file for complete search history.

(56) References Cited

U.S. PATENT DOCUMENTS

| | | | |
|---|---|---|---|
| 11,098,430 B2 | 8/2021 | Belveal et al. | |
| 2018/0114134 A1* | 4/2018 | Alva | G06Q 50/26 |
| 2019/0384991 A1 | 12/2019 | Lee et al. | |
| 2021/0108351 A1* | 4/2021 | Patterson | D06F 34/05 |
| 2022/0316124 A1* | 10/2022 | Yi | G06T 7/11 |

FOREIGN PATENT DOCUMENTS

| | | |
|---|---|---|
| CN | 101964098 A | 2/2011 |
| CN | 108053574 A | 5/2018 |
| CN | 105763652 B | 5/2019 |
| CN | 110241553 A | 9/2019 |
| JP | 2021107998 A | 7/2021 |
| KR | 20060120933 A | 11/2006 |

(Continued)

*Primary Examiner* — Kerri L Mcnally
(74) *Attorney, Agent, or Firm* — Dority & Manning, P.A.

(57) ABSTRACT

A method of identifying a lost item from a laundry appliance includes activating the laundry appliance in response to an input received from a remote user interface device associated with a first user account. Activating the laundry appliance includes performing a laundry treatment operation. The method also includes receiving an image of the lost item in or on the laundry appliance and an identifier of the laundry appliance from a remote user interface device associated with a second user account, after the laundry treatment operation is completed. The method further includes sending a notification to the remote user interface device associated with the first user account in response to receiving the image of the lost item.

20 Claims, 10 Drawing Sheets

(56) References Cited

FOREIGN PATENT DOCUMENTS

| KR | 20200032481 A | 3/2020 |
|---|---|---|
| TW | M512037 U | 11/2015 |
| WO | WO2014198608 A1 | 12/2014 |

\* cited by examiner

TRACKING PERSONAL ITEMS VIA LAUNDRY APPLIANCES RESERVATION SYSTEM

FIELD OF THE INVENTION

The present subject matter relates generally to laundry appliances with features for identifying lost items on or in one of the laundry appliances.

BACKGROUND OF THE INVENTION

Laundry appliances generally include washing machine appliances and dryer appliances. Such laundry appliances are typically paired, such that after washing a load of articles in the washing machine appliance of the pair, the load of articles may be easily transferred to the dryer appliance that is paired with the washing machine appliance.

Some laundry appliances, such as commercial laundry appliances, may be used by multiple users in any given day. For example, such laundry appliances may be found in a laundromat, dormitory, or apartment building, etc. In some instances, a user of such a laundry appliance may place a personal item, e.g., part of a load of articles, a book, a watch, a phone, and/or other similar items, on or in the laundry appliance or a nearby laundry appliances and then forget to retrieve their personal item(s) when the user leaves. Such items may then be found by a later user of the same laundry appliance or a nearby laundry appliances, however, the later user may not be able to locate or identify the owner of such items, e.g., when the owner has left the laundromat.

Thus, systems and methods for identifying lost personal items which may be found on or in a laundry appliance, such as identifying an owner of such items, e.g., based on use history of the laundry appliance and/or of other nearby laundry appliances, would be beneficial.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a method of identifying a lost item from a laundry appliance is provided. The method includes receiving an access request for the laundry appliance from a remote user interface device associated with a first user account and reserving the laundry appliance in response to the access request. The method also includes activating the laundry appliance after reserving the laundry appliance. Activating the laundry appliance includes performing a laundry treatment operation. The method further includes receiving an image of the lost item in or on the laundry appliance from a remote user interface device associated with a second user account, after the laundry treatment operation is completed. The method also includes sending a notification to the remote user interface device associated with the first user account in response to receiving the image of the lost item.

In accordance with another embodiment of the present disclosure, a method of identifying a lost item from a laundry appliance is provided. The method includes activating the laundry appliance in response to an input received from a remote user interface device associated with a first user account. Activating the laundry appliance includes performing a laundry treatment operation. The method also includes receiving an image of the lost item in or on the laundry appliance and an identifier of the laundry appliance from a remote user interface device associated with a second user account, after the laundry treatment operation is completed. The method further includes sending a notification to the remote user interface device associated with the first user account in response to receiving the image of the lost item.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
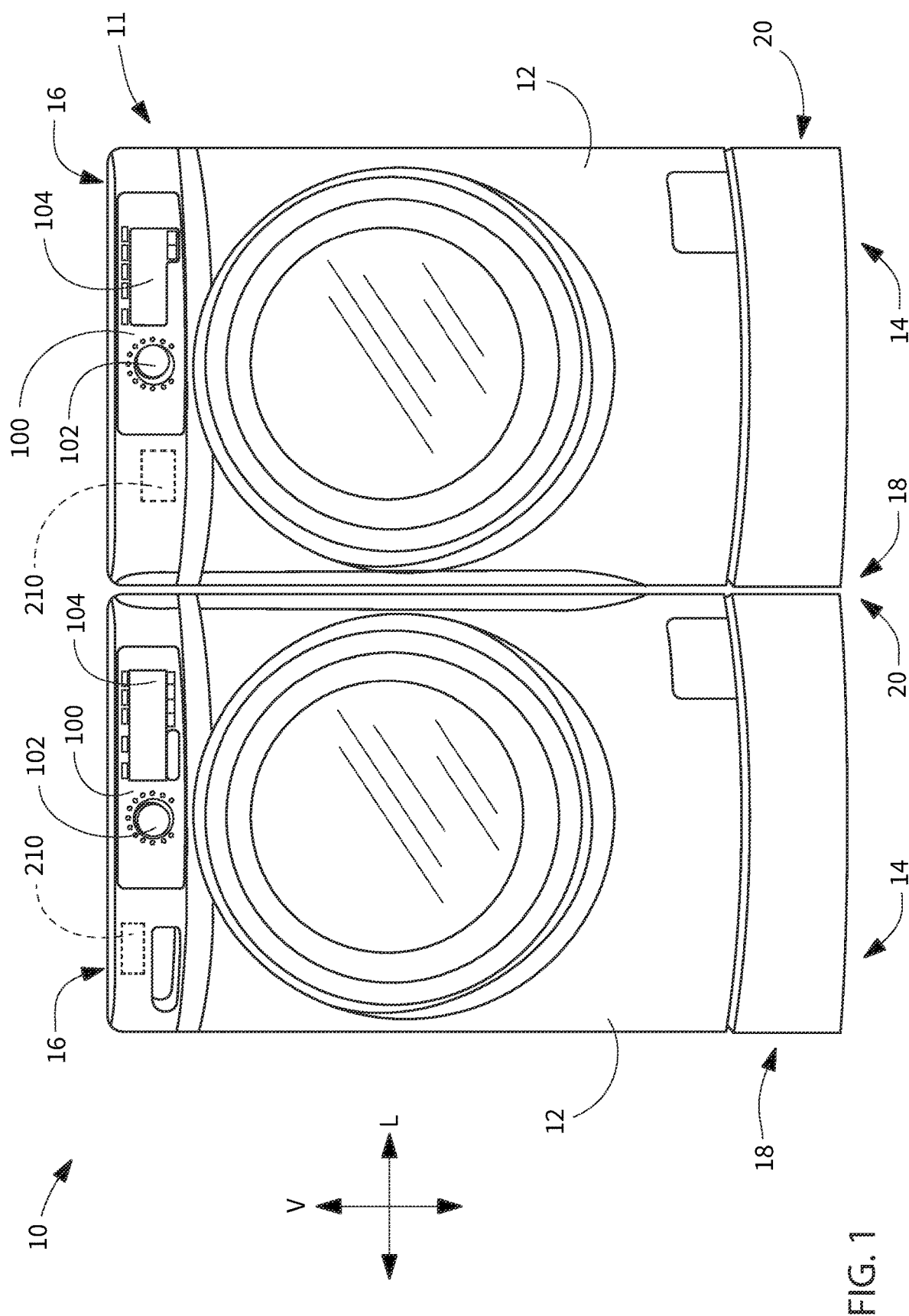
FIG. 1 provides a front view of an exemplary washing machine appliance and an exemplary dryer appliance in accordance with one or more exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counterclockwise.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
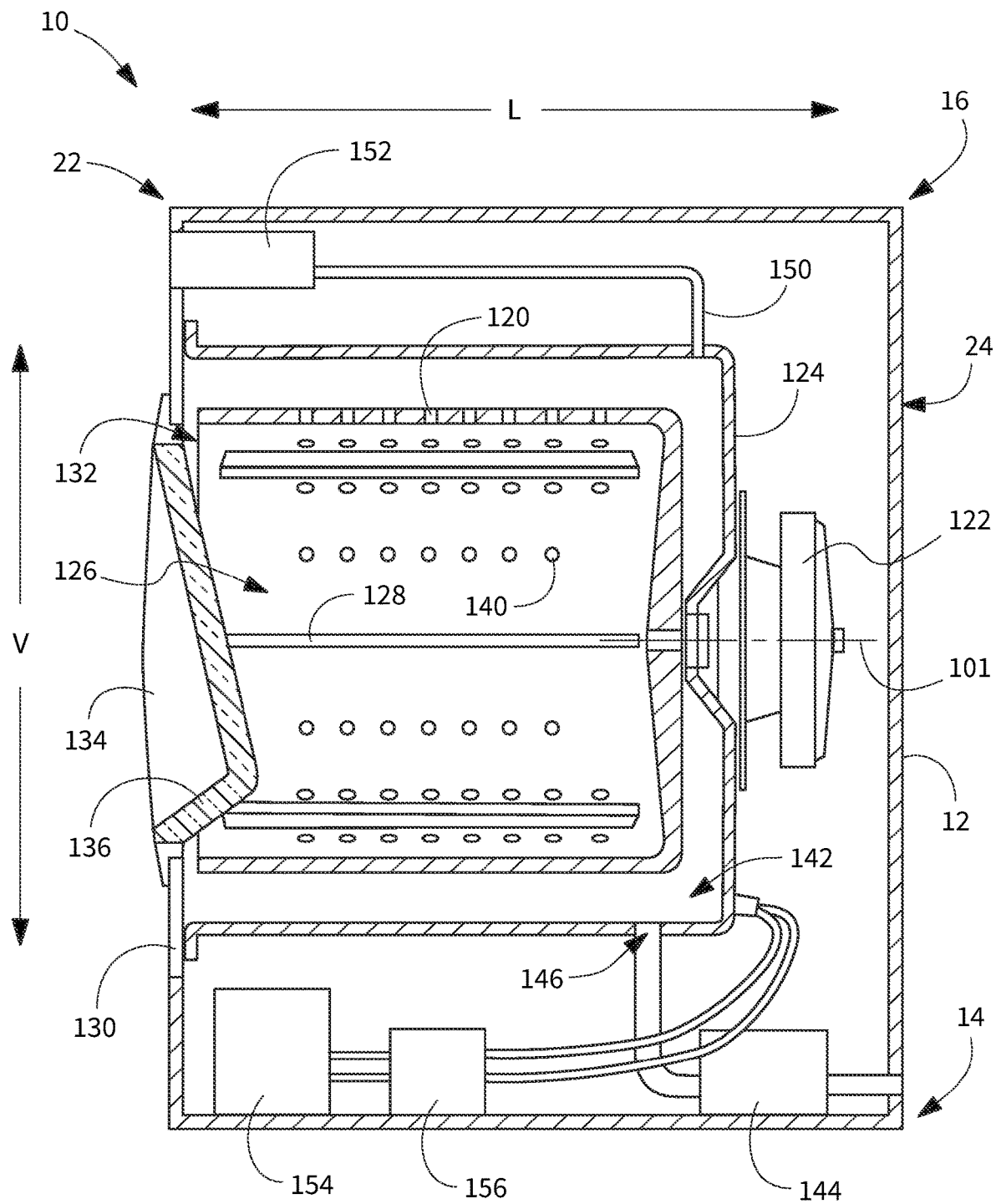
FIG. 2 provides a transverse cross-sectional view of the exemplary washing machine appliance of FIG. 1.
Figure 3:
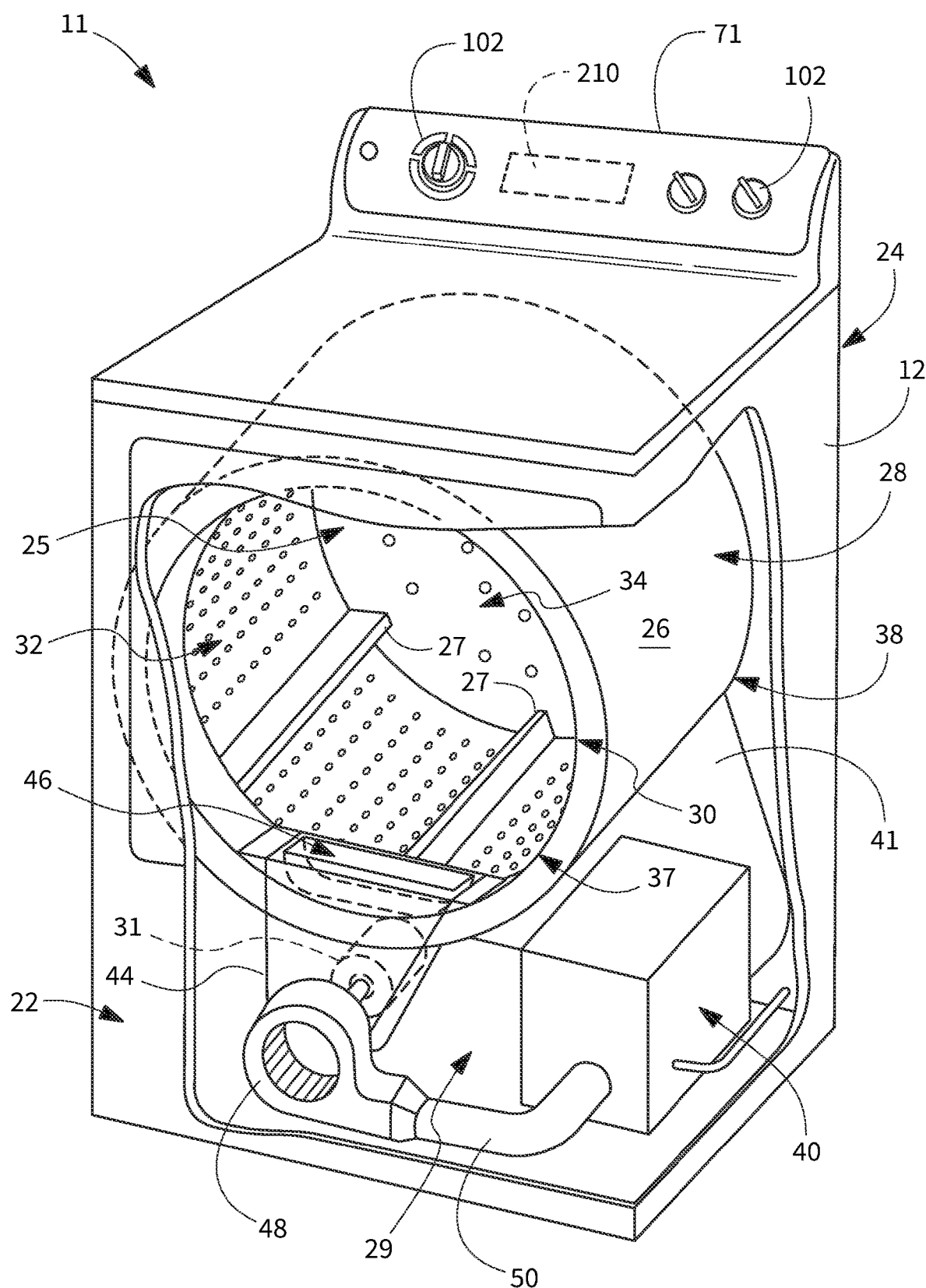
FIG. 3 provides a perspective view of the exemplary dryer appliance of FIG. 1 with portions of a cabinet of the dryer appliance removed to reveal certain components of the dryer appliance.

As may be seen, e.g., in FIGS. 1 through 3, embodiments of the present subject matter pertain to one or more laundry appliances, e.g., a washing machine appliance and/or a dryer appliance.

As may be seen generally throughout FIGS. 1 through 3, a user interface panel 100 and a user input device 102 may be positioned on an exterior of each laundry appliance. The user input device 102 is generally positioned proximate to the user interface panel 100, and in some embodiments, the user input device 102 may be positioned on the user interface panel 100.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical, or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be a user input device in addition to or instead of the user input device 102.

Generally, each appliance may include a controller 210 in operative communication with the user input device 102. The user interface panel 100 and the user input device 102 may be in communication with the controller 210 via, for example, one or more signal lines or shared communication busses. Input/output ("I/O") signals may be routed between controller 210 and various operational components of the appliance. Operation of the appliance can be regulated by the controller 210 that is operatively coupled to the user interface panel 100. A user interface panel 100 may for example provide selections for user manipulation of the operation of an appliance, e.g., via user input device 102 and/or display 104. In response to user manipulation of the user interface panel 100 and/or user input device 102, the controller 210 may operate various components of the appliance. Controller 210 may include a memory and one or more microprocessors, CPUs or the like, such as general or special purpose microprocessors operable to execute programming instructions or micro-control code associated with operation of the appliance. The memory may represent random access memory such as DRAM, or read only memory such as ROM or FLASH. In one embodiment, the processor executes programming instructions stored in memory. The memory may be a separate component from the processor or may be included onboard within the processor. Alternatively, a controller 210 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 210 may be programmed to operate the appliance by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions and/or instructions (e.g., performing the methods, steps, calculations and the like and storing relevant data as disclosed herein). It should be noted that controllers 210 as disclosed herein are capable of and may be operable to perform any methods and associated method steps as disclosed herein.

In some embodiments, for example, as illustrated in FIG. 1, the one or more laundry appliances may include a washing machine appliance 10 (or multiple washing machine appliances 10) and/or a dryer appliance 11 (or multiple dryer appliances 11). In embodiments such as illustrated in FIG. 1, the user input device 102 of each appliance 10 and 11 may be positioned on the user interface panel 100. The embodiment illustrated in FIG. 1 also includes a display 104 on the user interface panel 100 of each laundry appliance 10 and 11.

As generally seen throughout FIGS. 1 through 3, in at least some embodiments, each laundry appliance 10 and 11 includes a cabinet 12 which defines a vertical direction V and a lateral direction L that are mutually perpendicular. Each cabinet 12 extends between a top side 16 and a bottom side 14 along the vertical direction V. Each cabinet 12 also extends between a left side 18 and a right side 20, e.g., along the lateral direction L.

Additional exemplary details of the laundry appliances are illustrated in FIGS. 2 and 3. For example, FIG. 2 provides a cross-sectional view of the exemplary washing machine appliance 10. As illustrated in FIG. 2, a wash tub 124 is non-rotatably mounted within cabinet 12. As may be seen in FIG. 2, the wash tub 124 defines a central axis 101. In the example embodiment illustrated by FIG. 2, the central axis 101 may be oriented generally along or parallel to the transverse direction T of the washing machine appliance 10. Accordingly, the washing machine appliance 10 may be referred to as a horizontal axis washing machine.

Referring again to FIG. 2, a wash basket 120 is rotatably mounted within the tub 124 such that the wash basket 120 is rotatable about an axis of rotation, which generally coincides with central axis 101 of the tub 124. A motor 122, e.g., such as a pancake motor, is in mechanical communication with wash basket 120 to selectively rotate wash basket 120 (e.g., during an agitation or a rinse cycle of washing machine appliance 10). Wash basket 120 defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. The wash basket 120 and the tub 124 may collectively define at least a portion of a tub assembly for the washing machine appliance 10.

Wash basket 120 may define one or more agitator features that extend into wash chamber 126 to assist in agitation and cleaning of articles disposed within wash chamber 126 during operation of washing machine appliance 10. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 12 also includes a front panel 130 which defines an opening 132 that permits user access to wash basket 120 within wash tub 124. More specifically, washing machine appliance 10 includes a door 134 that is positioned in front of opening 132 and is rotatably mounted to front panel 130. Door 134 is rotatable such that door 134 permits selective access to opening 132 by rotating between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 10. Door 134 also includes a handle (not shown) that, e.g., a user may pull when opening and closing door 134. Further, although door 134 is illustrated as mounted to front panel 130, it should be appreciated that door 134 may be mounted to another side of cabinet 12 or any other suitable support according to alternative embodiments.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 10. For example, during operation of washing machine appliance 10, wash fluid may be urged by gravity from basket 120 to sump 142 through plurality of perforations 140. A pump assembly 144 is located beneath tub 124 for gravity assisted flow when draining tub 124, e.g., via a drain 146. Pump assembly 144 may be configured for recirculating wash fluid within wash tub 124.

A spout 150 is configured for directing a flow of fluid into wash tub 124. For example, spout 150 may be in fluid communication with a water supply (not shown) in order to direct fluid (e.g., clean water) into wash tub 124. Spout 150 may also be in fluid communication with the sump 142. For example, pump assembly 144 may direct wash fluid disposed in sump 142 to spout 150 in order to circulate wash fluid in wash tub 124.

As illustrated in FIG. 2, a detergent drawer 152 is slidably mounted within front panel 130. Detergent drawer 152 receives a wash additive (e.g., detergent, fabric softener, bleach, or any other suitable liquid or powder) and directs the fluid additive to wash chamber 124 during operation of washing machine appliance 10. According to the illustrated embodiment, detergent drawer 152 may also be fluidly coupled to spout 150 to facilitate the complete and accurate dispensing of wash additive.

Additionally, a bulk reservoir 154 is disposed within cabinet 12. Bulk reservoir 154 is also configured for receipt of fluid additive for use during operation of washing machine appliance 10. Bulk reservoir 154 is sized such that a volume of fluid additive sufficient for a plurality or multitude of wash cycles of washing machine appliance 10 (e.g., five, ten, twenty, fifty, or any other suitable number of wash cycles) may fill bulk reservoir 154. Thus, for example, a user can fill bulk reservoir 154 with fluid additive and operate washing machine appliance 10 for a plurality of wash cycles without refilling bulk reservoir 154 with fluid additive. A reservoir pump 156 is configured for selective delivery of the fluid additive from bulk reservoir 154 to wash tub 124.

During operation of washing machine appliance 10, e.g., during a wash cycle of the washing machine appliance 10, laundry items are loaded into wash basket 120 through opening 132, and washing operation is initiated through operator manipulation of input selectors 102. Wash tub 124 is filled with water, detergent, and/or other fluid additives, e.g., via spout 150 and/or detergent drawer 152. One or more valves (not shown) can be controlled by washing machine appliance 10 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a spin cycle, basket 120 is rotated at relatively high speeds. After articles disposed in wash basket 120 are cleaned and/or washed, the user can remove the articles from wash basket 120, e.g., by opening door 134 and reaching into wash basket 120 through opening 132.

While described in the context of a specific embodiment of horizontal axis washing machine appliance 10, using the teachings disclosed herein it will be understood that horizontal axis washing machine appliance 10 is provided by way of example only. It should be appreciated that the present subject matter is not limited to any particular style, model, or configuration of washing machine appliance. Other washing machine appliances having different configurations, different appearances, and/or different features may also be utilized with the present subject matter as well, e.g., vertical axis washing machine appliances.

FIG. 3 provides a perspective view of the dryer appliance 11 of FIG. 1, which is an example embodiment of a laundry appliance, with a portion of a cabinet or housing 12 of dryer appliance 11 removed in order to show certain components of dryer appliance 11. Dryer appliance 11 generally defines a vertical direction V, a lateral direction L, and a transverse direction T, each of which is mutually perpendicular, such that an orthogonal coordinate system is defined. While described in the context of a specific embodiment of dryer appliance 11, using the teachings disclosed herein, it will be understood that dryer appliance 11 is provided by way of example only. Other dryer appliances having different appearances and different features may also be utilized with the present subject matter as well.

Cabinet 12 includes a front side 22 and a rear side 24 spaced apart from each other along the transverse direction T. Within cabinet 12, an interior volume 29 is defined. A drum or container 26 is mounted for rotation about a substantially horizontal axis within the interior volume 29. Drum 26 defines a chamber 25 for receipt of articles of clothing for tumbling and/or drying. Drum 26 extends between a front portion 37 and a back portion 38. Drum 26 also includes a back or rear wall 34, e.g., at back portion 38 of drum 26. A supply duct 41 may be mounted to rear wall 34 and receives heated air that has been heated by a heating assembly or system 40.

As used herein, the terms "clothing" or "articles" include but need not be limited to fabrics, textiles, garments, linens, papers, or other items from which the extraction of moisture is desirable. Furthermore, the term "load" or "laundry load" refers to the combination of clothing that may be washed together in a washing machine or dried together in a dryer appliance 11 (e.g., clothes dryer) and may include a mixture of different or similar articles of clothing of different or similar types and kinds of fabrics, textiles, garments, and linens within a particular laundering process.

A motor 31 is provided in some embodiments to rotate drum 26 about the horizontal axis, e.g., via a pulley and a belt (not pictured). Drum 26 is generally cylindrical in shape, having an outer cylindrical wall 28 and a front flange or wall 30 that defines an opening 32 of drum 26, e.g., at front portion 37 of drum 26, for loading and unloading of articles into and out of chamber 25 of drum 26. A plurality of lifters or baffles 27 are provided within chamber 25 of drum 26 to lift articles therein and then allow such articles to tumble back to a bottom of drum 26 as drum 26 rotates. Baffles 27 may be mounted to drum 26 such that baffles 27 rotate with drum 26 during operation of dryer appliance 11.

The rear wall 34 of drum 26 may be rotatably supported within the cabinet 12 by a suitable fixed bearing. Rear wall 34 can be fixed or can be rotatable. Rear wall 34 may include, for instance, a plurality of holes that receive hot air that has been heated by heating system 40. The heating system 40 may include, e.g., a heat pump, an electric heating element, and/or a gas heating element (e.g., gas burner). Moisture laden, heated air is drawn from drum 26 by an air handler, such as blower fan 48, which generates a negative air pressure within drum 26. The moisture laden heated air passes through a duct 44 enclosing screen filter 46, which traps lint particles. As the air passes from blower fan 48, it enters a duct 50 and then is passed into heating system 40. In some embodiments, the dryer appliance 11 may be a conventional dryer appliance, e.g., the heating system 40 may be or include an electric heating element, e.g., a resistive heating element, or a gas-powered heating element, e.g., a gas burner. In other embodiments, the dryer appliance may be a condensation dryer, such as a heat pump dryer. In such embodiments, heating system 40 may be or include a heat pump including a sealed refrigerant circuit. Heated air (with a lower moisture content than was received from drum 26), exits heating system 40 and returns to drum 26 by duct 41. After the clothing articles have been dried, they are removed from the drum 26 via opening 32. A door (FIG. 1) provides for closing or accessing drum 26 through opening 32.

In some embodiments, one or more selector inputs 102, such as knobs, buttons, touchscreen interfaces, etc., may be provided or mounted on the cabinet 12 (e.g., on a backsplash 71) and are in operable communication (e.g., electrically coupled or coupled through a wireless network band) with the processing device or controller 210. Controller 210 may also be provided in operable communication with components of the dryer appliance 11 including motor 31, blower 48, or heating system 40. In turn, signals generated in controller 210 direct operation of motor 31, blower 48, or heating system 40 in response to the position of inputs 102. As used herein, "processing device" or "controller" may refer to one or more microprocessors, microcontroller, ASICS, or semiconductor devices and is not restricted necessarily to a single element. The controller 210 may be programmed to operate dryer appliance 11 by executing instructions stored in memory (e.g., non-transitory media). The controller 56 may include, or be associated with, one or more memory elements such as RAM, ROM, or electrically erasable, programmable read only memory (EEPROM). For example, the instructions may be software or any set of instructions that when executed by the processing device, cause the processing device to perform operations. It should be noted that controllers as disclosed herein are capable of and may be operable to perform any methods and associated method steps as disclosed herein. For example, in some embodiments, methods disclosed herein may be embodied in programming instructions stored in the memory and executed by the controller 210.

Figure 4:
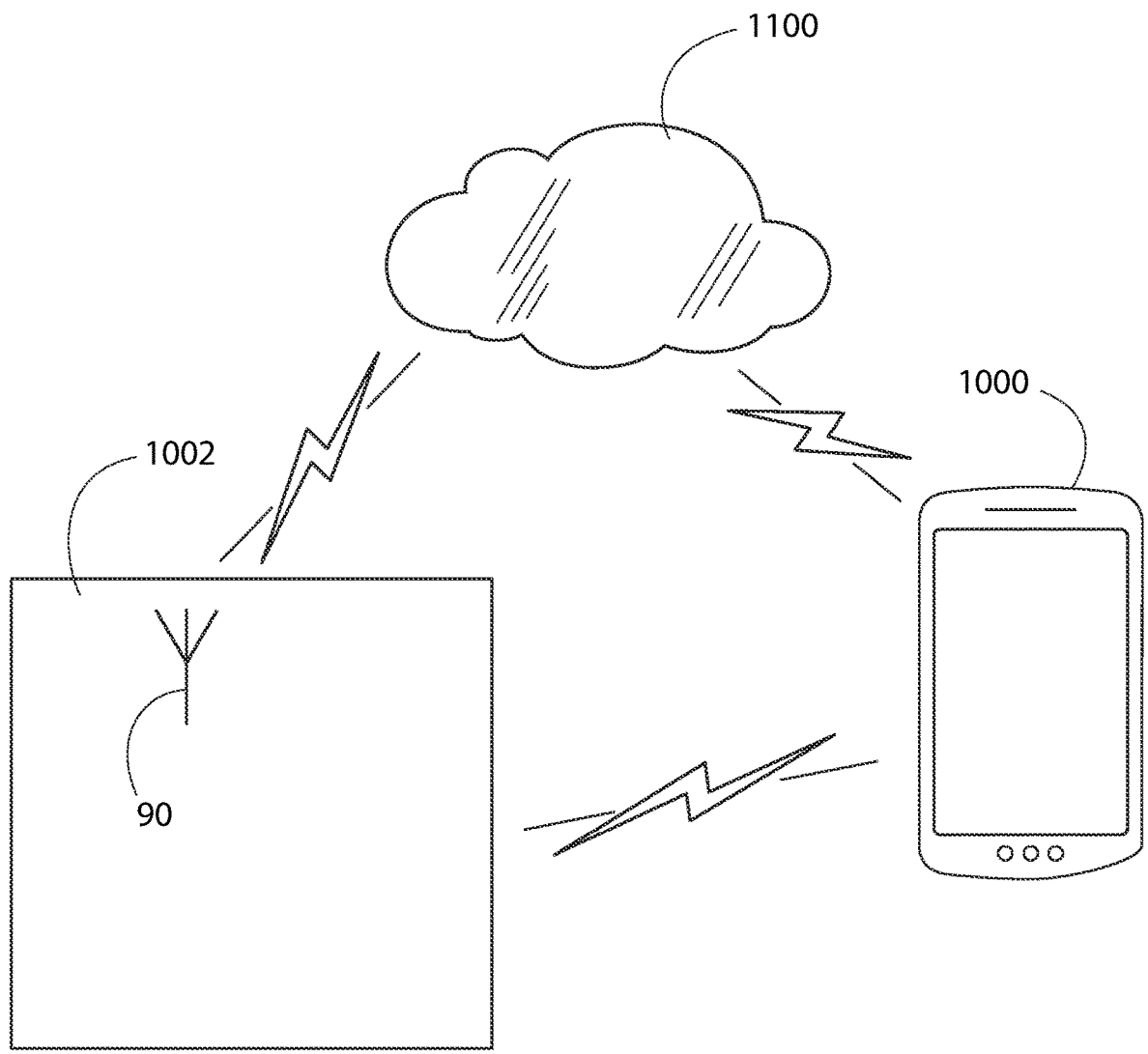
FIG. 4 provides a schematic diagram of a laundry appliance in communication with a remote user interface device and a remote database according to one or more embodiments of the present disclosure.

Turning now to FIG. 4, a general schematic of a laundry appliance 1002, which may be, e.g., the washing machine appliance 10 or the dryer appliance 11 described above (or both) and communication features thereof. FIG. 4 schematically illustrates a laundry appliance 1002, which may be, for example, one of the laundry appliances 10 or 11 of FIGS. 1 through 3, among other possible example laundry appliances, which communicates wirelessly with a remote user interface device 1000. For example, as illustrated in FIG. 4, the laundry appliance 1002 may include an antenna 90 by which the laundry appliance 1002 communicates with, e.g., sends and receives signals to and from, the remote user interface device 1000. The laundry appliance 1002 may communicate with the remote user interface device 1000 over a direct wireless communication link or over an indirect wireless communication link, such as via one or more remote computing devices, e.g., a remote server, a network, or one or more other intervening devices, which are generally represented by cloud 1100 in FIG. 4. The remote user interface device 1000 may be a laptop computer, smartphone, tablet, personal computer, wearable device, smart home system, and/or various other suitable devices.

The laundry appliance 1002 may be in communication with the remote user interface device 1000 device through various possible communication connections and interfaces. The laundry appliance 1002 and the remote user interface device 1000 may be matched in wireless communication, e.g., connected to the same wireless network. The laundry appliance 1002 may communicate with the remote user interface device 1000 via short-range radio such as BLU- ETOOTH® or any other suitable wireless network having a layer protocol architecture. As used herein, "short-range" may include ranges less than about ten meters and up to about one hundred meters. For example, the wireless network may be adapted for short-wavelength ultra-high frequency (UHF) communications in a band between 2.4 GHz and 2.485 GHz (e.g., according to the IEEE 802.15.1 standard). In particular, BLUETOOTH® Low Energy, e.g., BLUETOOTH® Version 4.0 or higher, may advantageously provide short-range wireless communication between the appliance 10 and the remote user interface device 1000. For example, BLUETOOTH® Low Energy may advantageously minimize the power consumed by the exemplary methods and devices described herein due to the low power networking protocol of BLUETOOTH® Low Energy.

The remote user interface device 1000 is "remote" at least in that it is spaced apart from and not physically connected to the laundry appliance 1002, e.g., the remote user interface device 1000 is a separate, stand-alone device from the laundry appliance 1002 which communicates with the laundry appliance 1002 wirelessly. Any suitable device separate from the laundry appliance 1002 that is configured to provide and/or receive communications, information, data, or commands from a user may serve as the remote user interface device 1000, such as a smartphone (e.g., as illustrated in FIG. 4), smart watch, personal computer, smart home system, or other similar device. For example, the remote user interface device 1000 may be a smartphone operable to store and run applications, also known as "apps," and some or all of the method steps disclosed herein may be performed by a smartphone app.

The remote user interface device 1000 may include a memory for storing and retrieving programming instructions. Thus, the remote user interface device 1000 may provide a remote user interface which may be an additional user interface to the user interface panel 100. For example, the remote user interface device 1000 may be a smartphone operable to store and run applications, also known as "apps," and the remote user interface may be provided as a smartphone app.

As mentioned above, the laundry appliance 1002 may also be configured to communicate wirelessly with one or more remote computing devices 1100, and the one or more remote computing devices may be or may include a remote database. The remote database may be, e.g., a cloud-based data storage system. For example, the laundry appliance 1002 may communicate with the remote database over the Internet, which the laundry appliance 1002 may access via WI-FI®, such as from a WI-FI® access point in a user's home.

Figure 5:
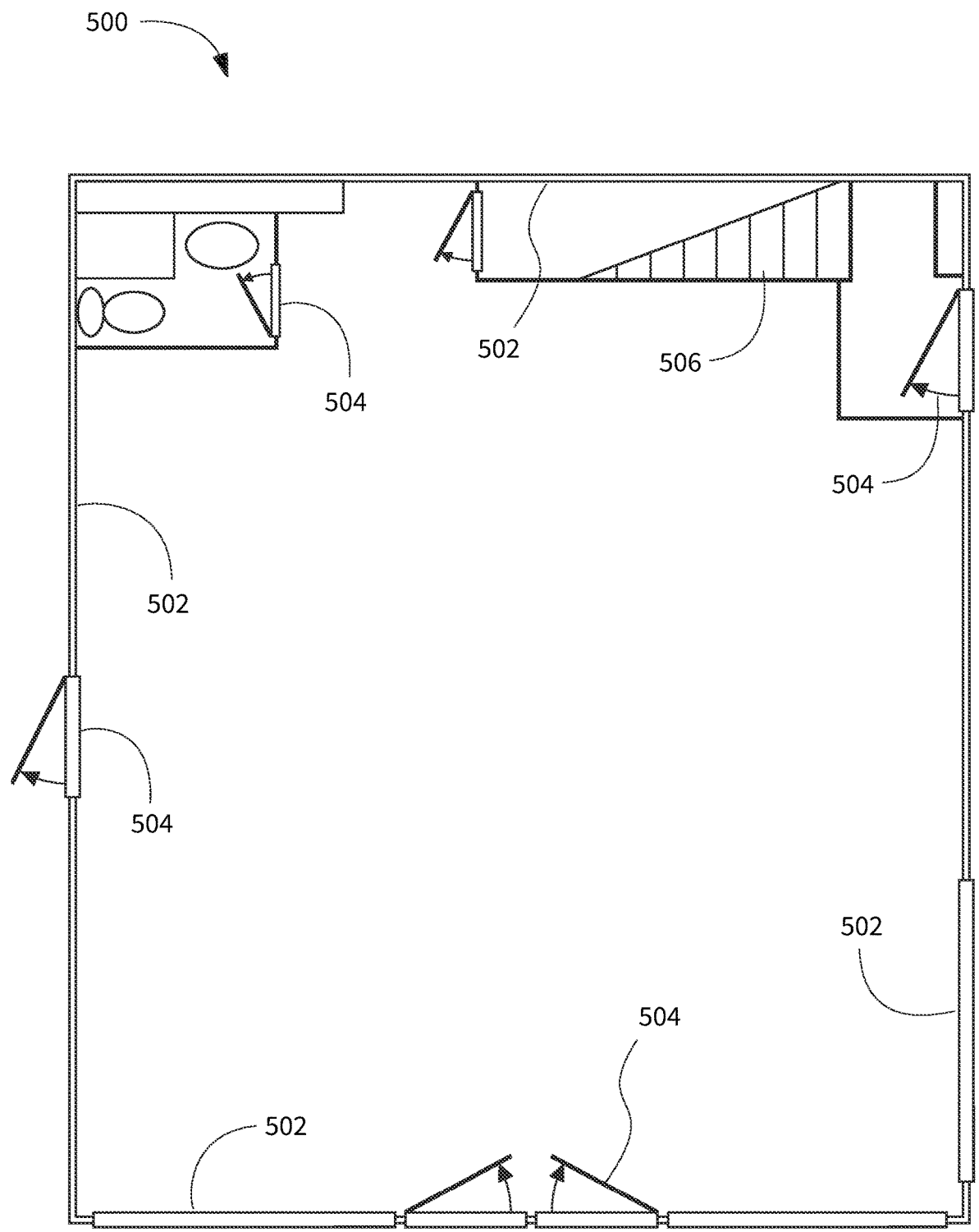
FIG. 5 provides an exemplary floor plan according to one or more embodiments of the present disclosure.

FIG. 5 illustrates an exemplary floor plan 500 of a room, such as a laundromat, which may be uploaded by an owner of the laundromat according to one or more embodiments of the present disclosure. The room represented by the floor plan 500 may also be, e.g., a laundry room in a dormitory or apartment complex, or any other room in which multiple laundry appliances may be located. For example, the floor plan 500 may be uploaded to a remote computing device 1100, such as a database or server, e.g., via the internet. In some embodiments, the remote computing device 1100 may be part of a distributed computing environment, such as the cloud, the fog, and/or the edge. The floor plan 500 may be, for example, any suitable image file format, such as but not limited to a JPEG or PDF image file, that is uploaded to the remote computing device, e.g., in the cloud, from a user interface device such as a smartphone, tablet computer, laptop or desktop computer, or other similar device.

As illustrated for example in FIG. 5, the floor plan 500 may include a general outline of the room, such as an indication of the location and size of walls 502 of the room and doors 504 therein. The floor plan 500 may also include, in some exemplary embodiments, a location of stairs 506. Additionally, after or during the upload process for the floor plan, e.g., the upload process for the image file containing the floor plan, a prompt or input field may be provided for dimension data of the room, e.g., laundromat, that is represented by the floor plan 500. Thus, dimensions may also be input or uploaded and associated with the floor plan 500.

In embodiments where the dimensions of the laundromat are also uploaded, the floor plan 500 may be scaled correspondingly to the uploaded dimensions, e.g., the floor plan 500 may be scaled to fit a display of a user interface device and may be scaled proportionally to the uploaded dimensions. The uploaded dimensions may include or correspond to a length and a width of the laundromat, e.g., where the laundromat is rectangular, and/or additional dimensions of the laundromat, such as where the laundromat is a more complex shape. For example, the floor plan 500 may be scaled according to the uploaded dimensions such that the size of icons representing laundry appliances in the laundromat is proportional to the size of the floor plan 500, such as to ensure accurate locations of the laundry appliances within the room, e.g., laundromat, and accurate distances between the laundry appliances within the room. For example, the ratio or relative size of the floor plan 500 as displayed on a screen may be proportional to the actual dimensions (e.g., as uploaded) of the laundromat and laundry appliances which are also displayed on the screen may share the same ratio of actual dimensions to on-screen dimensions as the room, e.g., walls 502 thereof, in the floor plan 500.

After the floor plan 500 is uploaded, the floor plan 500 may be accessed and displayed on a user interface device, such as in an application, e.g., "app," running on a smartphone device, tablet computer, and/or other similar user interface device. As will be discussed further in regard to FIG. 6, commissioned laundry appliances may be displayed on or in the floor plan 500, e.g., in the app.

Figure 6:
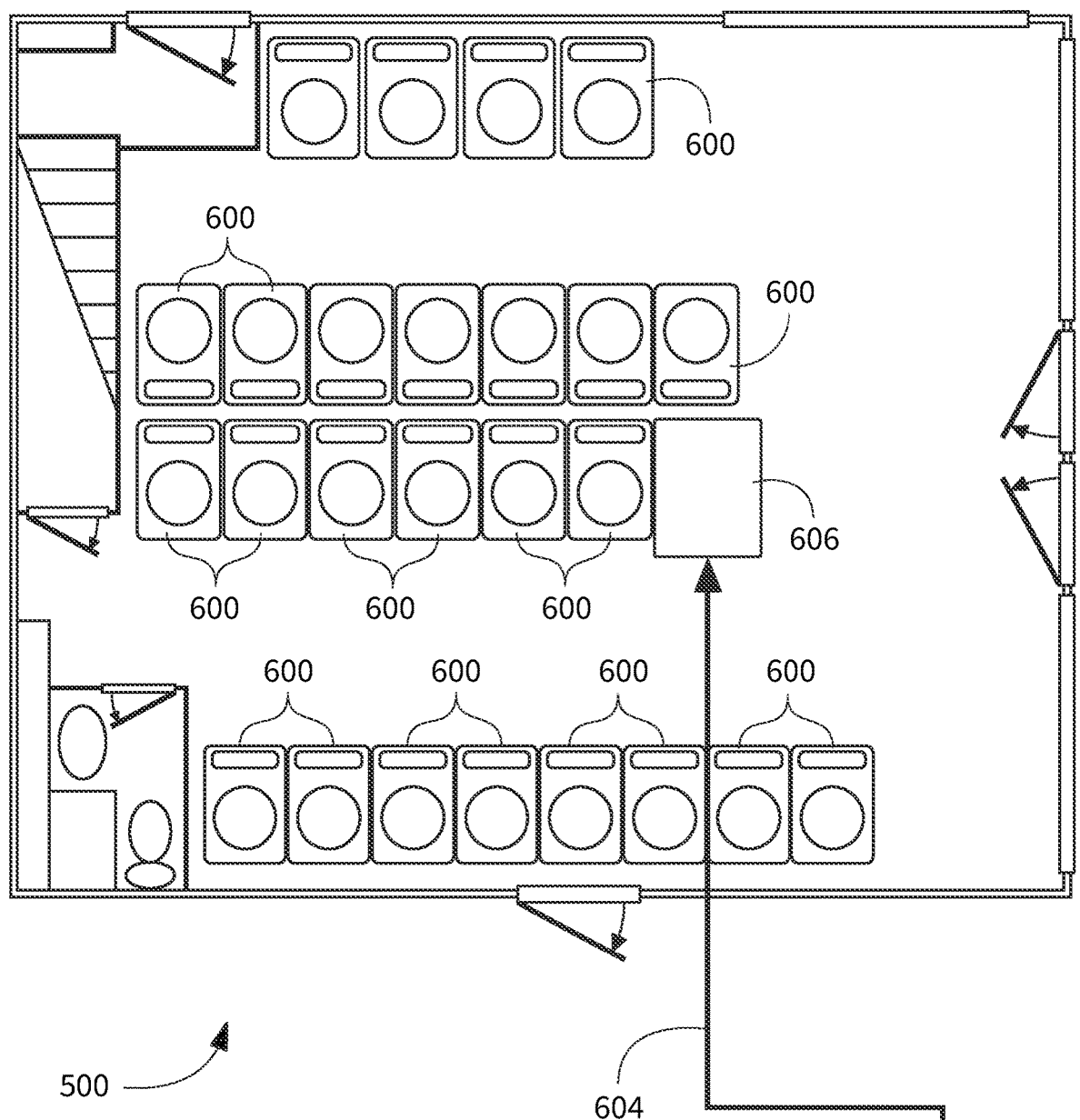
FIG. 6 illustrates populating the floor plan with location information for a group of laundry appliances according to one or more embodiments of the present disclosure.

Turning now to FIG. 6, in some embodiments, a plurality of laundry appliances, e.g., a plurality of washing machine appliances 10 and a plurality of dryer appliances 11, may be identified on the floor plan 500. The laundry appliances may be represented by icons, such as laundry appliance icons 600, each of which represents one washing machine appliance 10 or one dryer appliance 11. In some embodiments, separate or distinct icons may be used to distinguish between washing machine appliances and dryer appliances, and in other embodiments, each laundry appliance may be represented by a common or generic icon. The plurality of laundry appliances may be manually entered or selected by the owner on the floor plan 500. In some embodiments, for example as illustrated in FIG. 6, each appliance may be added to the floor plan 500 by a drag-and-drop interface, e.g., as illustrated in FIG. 6, a laundry appliance may be added to the plurality of laundry appliances on the floor plan 500 by dragging a representative laundry appliance icon 600 onto the floor plan 500, e.g., as represented by arrow 604, and dropping the representative icon into place at the location 606 in the floor plan 500, while the floor plan 500 is displayed on the screen of the user interface device, and where location 606 on the floor plan 500 corresponds to the actual location of the laundry appliance in the room, e.g., laundromat, represented by the floor plan 500.

Figure 7:
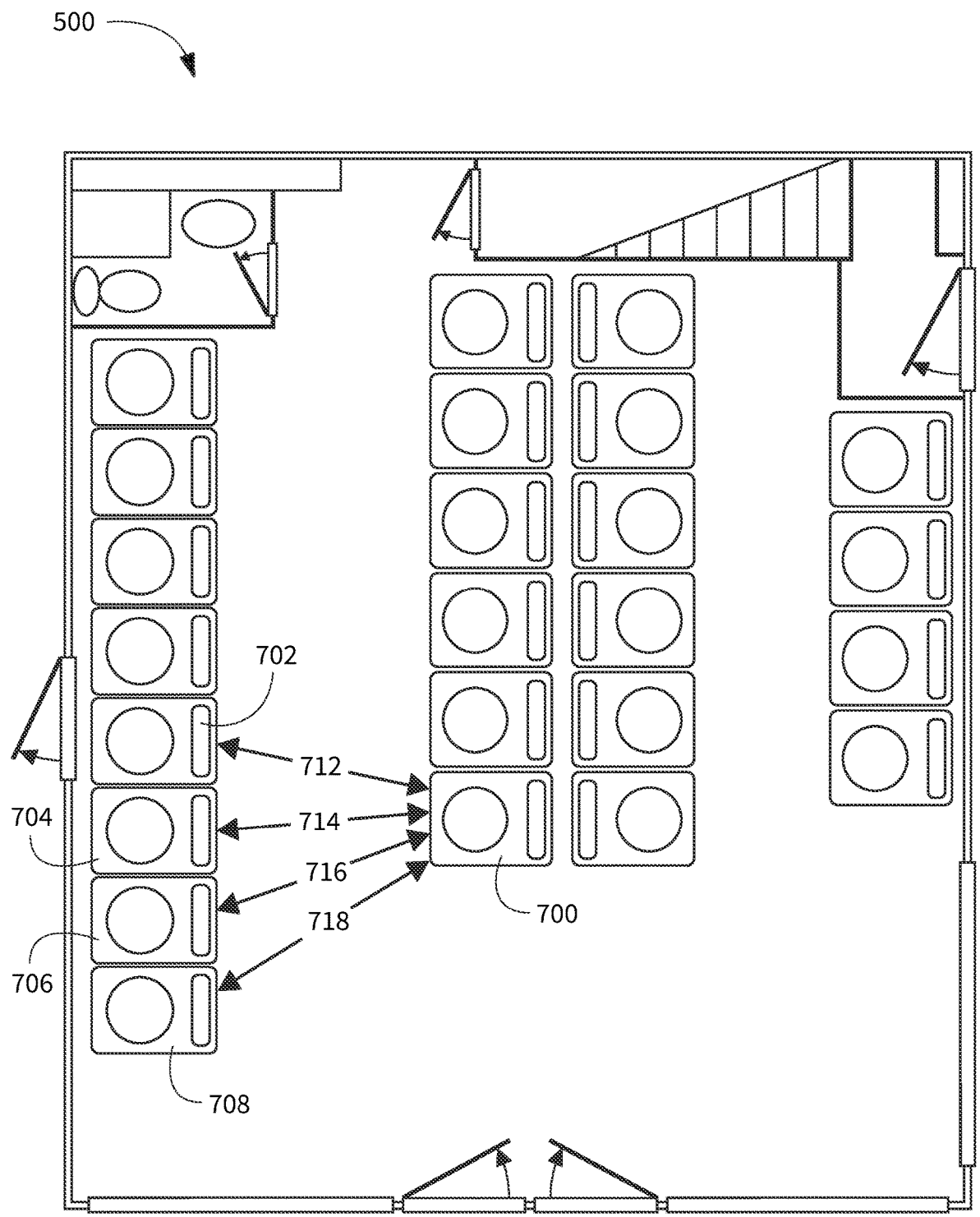
FIG. 7 provides a view of the floor plan of FIG. 6 with a group of laundry appliances added thereto.

In some embodiments, e.g., as illustrated in FIG. 7, the floor plan 500 and the location information of the laundry appliances therein may be used to determine or calculate distances between various laundry appliances, such as distances between each laundry appliance represented by a washing machine icon 600 and every other laundry appliance represented on the floor plan 500. For example, given a selected laundry appliance 700, e.g., which may be a laundry appliance on or in which a lost item has been found, as will be discussed further below, one or more nearby, e.g., closest, other laundry appliances to the selected laundry appliance 700 may be determined from the floor plan 500. As illustrated in FIG. 7, a first nearby laundry appliance (as represented by icon 702 in the floor plan 500) may be a first distance 712 away from the selected laundry appliance 700, a second nearby laundry appliance (as represented by icon 704) may be a second distance 714 away from the selected laundry appliance 700, a third nearby laundry appliance (as represented by icon 706) may be a third distance 716 away from the selected laundry appliance 700, and a fourth nearby laundry appliance (as represented by icon 708) may be a fourth distance 718 away from the selected laundry appliance 700. Additional distances may be determined from the floor plan 500 as well, such as from the selected laundry appliance to any or all remaining laundry appliances in the room.

Figure 8:
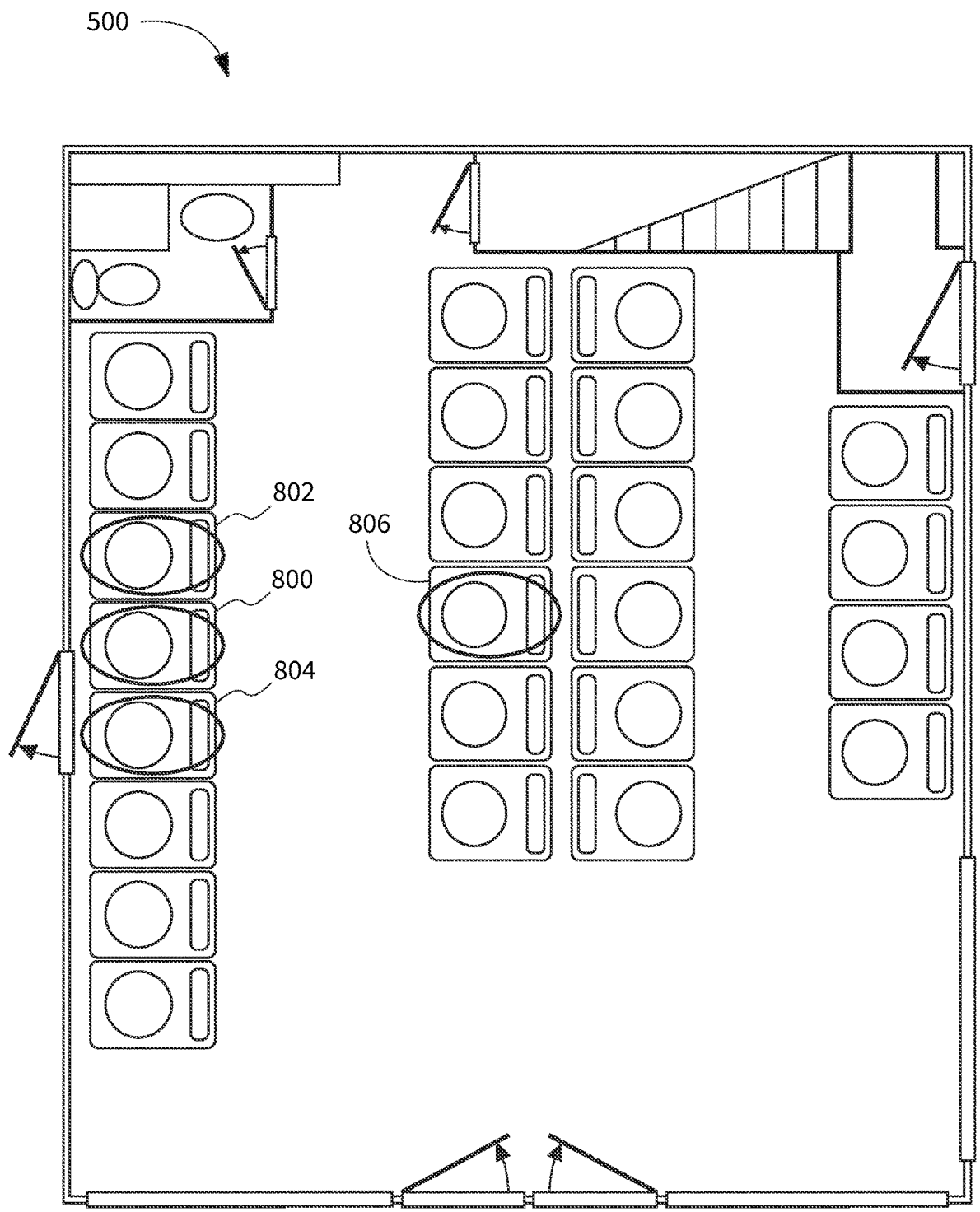
FIG. 8 illustrates using the floor plan of FIG. 7 to identify one or more nearby laundry appliances to a selected one laundry appliance of the group of laundry appliances.

Referring now to FIG. 8, some embodiments of the present disclosure may also include determining, locating, and/or identifying one or more nearby laundry appliances to a first laundry appliance 800, which may be the laundry appliance on or in which the lost item was found. The circled laundry appliance icons 802, 804, and 806 each represents a laundry appliance that is one of the closest to the first laundry appliance 800, e.g., as may be determined based on the distances indicated in FIG. 7 and described above. When a user sets down a personal item while using a laundry appliance, the user most often sets the item on the laundry appliance the user is accessing at the time, or a nearby, e.g., adjoining, laundry appliance. Accordingly, when a lost item is found on or in laundry appliance 800, the owner of the lost item is most likely to have been a previous user of the laundry appliance 800 itself, and/or of one of the nearby or adjoining laundry appliances 802, 804, and 806. In various embodiments, determining or identifying one or more nearby appliances to a selected laundry appliance may include selecting the one closest laundry appliance, the two closest laundry appliances, or more than three closest laundry appliances to the selected laundry appliance, e.g., the laundry appliance on or in which the lost item was found. Such distances and relative proximities between and among the group of laundry appliances may be determined from the floor plan 500. In some embodiments, e.g., as illustrated in FIG. 8, the nearby laundry appliances may include laundry appliances next to the first laundry appliance 800, such as a first nearby appliance 802 to the right of the first laundry appliance 800 and a second nearby appliance 804 to the left of the first laundry appliance 800, and a third nearby laundry appliance 806 across from the first laundry appliance.

Figure 9:
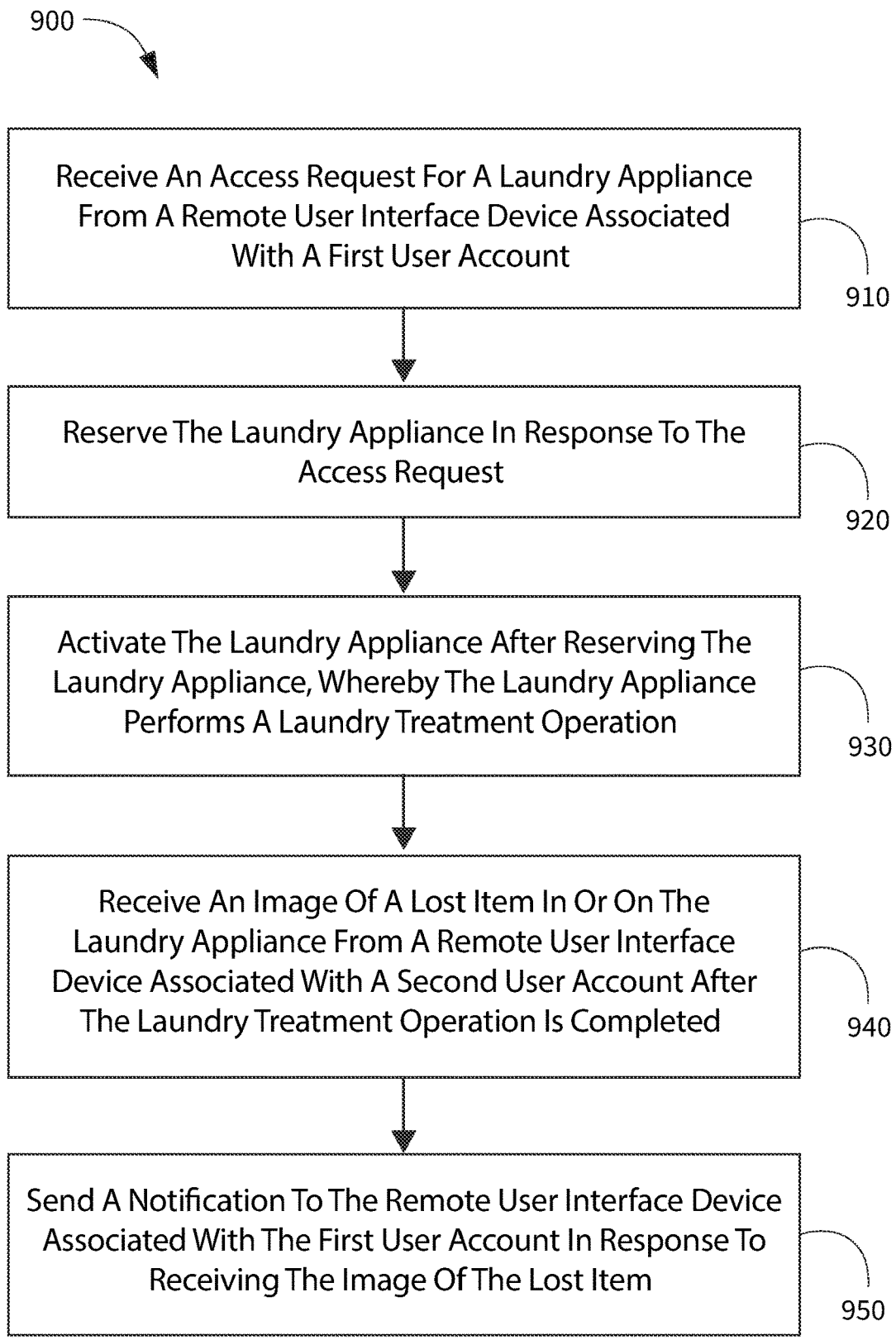
FIG. 9 provides a flowchart illustrating an example method of identifying a lost item from a laundry appliance according to one or more embodiments of the present disclosure.

As illustrated in FIG. 9, embodiments of the present disclosure also include methods of identifying a lost item from a laundry appliance, e.g., one of the laundry appliances 10 and 11 described above, among other possible exemplary laundry appliances. Exemplary methods according to the present subject matter include the method 900 illustrated in FIG. 9. Such methods may be wholly or partially computer-implemented, such as implemented by a controller, e.g., controller 210, of one or more laundry appliances and/or implemented by one or more remote computing devices 1100, e.g., in the cloud, fog, and/or edge.

As illustrated in FIG. 9, the method 900 may include a step 910 of receiving an access request for a laundry appliance. The request may be received from a first user, e.g., who is logged into a first user account, such as in a laundry app. The access request may be received via a remote user interface device, such as the remote user interface device 1000 described above, where the remote user interface device may be running the laundry app. For example, the first user may input the access request via the remote user interface device associated with the first user account, and the access request for the laundry appliance may be received, e.g., by controller 210 and/or a remote computing device 1100, from the remote user interface device associated with the first user account.

Method 900 may further include a step 920 of reserving the laundry appliance in response to the access request. For example, reserving the laundry appliance may include locking the laundry appliance and unlocking the laundry appliance via the user account for which the laundry appliance was reserved. For example, in some embodiments, the access request for the washing machine appliance may be received from a user and may be received via a remote user interface device, such as the remote user interface device 1000 described above. The access request for the washing machine appliance may be received by a remote computing device, such as in a cloud or other distributed computing environment, e.g., a remote database which includes (e.g., stores) an inventory of laundry appliances, and the remote computing device may also include features for, e.g., be configured for, managing the status of one or more laundry appliances, such as a group of laundry appliances in a laundromat (including multiple distinct locations, such as multiple commonly-owned commercial laundry facilities, such as different branches of a chain laundromat). Managing the status of the one or more laundry appliances may include receiving access requests, reserving one or more laundry appliances in response to such requests, e.g., reserving may include limiting access to only the user account from which the access request was received, such as limiting access for a predefined reservation time, and may further include collecting and applying payments or other credits for accessing and using the one or more laundry appliances, such as maintaining and updating a user account balance. For example, exemplary methods according to one or more embodiments of the present disclosure may include managing status of one or more laundry appliances, which may include identifying or selecting a laundry appliance in response to a user input received at a remote user interface device, and the remote user interface device may then relay such input to the remote computing device (or devices) for identification and/or selection of an available laundry appliance matching the request, such as having capabilities matching a request, e.g., reserving a washing machine appliance in response to an access request for a washing machine appliance and/or reserving a dryer appliance in response to an access request for a dryer appliance, etc. Various steps, such as but not limited to receiving the access request, managing access, maintaining user account balance, etc., may be performed by one or more remote computing devices, e.g., in the cloud such as in a cloud system owned and/or operated by a manufacturer of the laundry appliance.

Method 900 may then include a step 930 of activating the reserved laundry appliance, e.g., which may include performing a performing a laundry treatment operation such as a wash cycle including flowing wash liquid into the tub 124 urging wash liquid through the washing machine appliance by pump 156 and/or pump 144, rotating the basket 120 by the motor 122, etc., or a dry cycle including rotating the drum 26, activating the heating system 40, etc., as described above and as is understood by those of ordinary skill in the art. The laundry appliance may be activated via a local user interface, e.g., by pressing a button on the user interface panel 100, or via a remote user interface device, such as selecting the dryer appliance on a touchscreen, e.g., of a smartphone. The laundry appliance may be activated in response to a start input received via a local user interface, e.g., by pressing a button on the user interface panel 100, or via a remote user interface device, such as an input on a touchscreen, e.g., of a smartphone. The laundry treatment operation may include, for example, washing and/or drying articles in the laundry appliance, such as in the exemplary operation (wash cycle) of the washing machine appliance 10 described above, an exemplary drying operation of the dryer appliance 11 described above, or other similar laundry treatment operation.

After the laundry treatment operation is completed, e.g., when the first user (e.g., owner of the first user account) is likely to have left the laundromat, method 900 may further include a step 940 of receiving an image of the lost item in or on the laundry appliance from a remote user interface device associated with a second user account. For example, when another user, e.g., the user associated with the second user account, such as the owner of the second user account, finds the lost item on or in the laundry appliance, the second user may not be able to locate or identify the first user in order to return the lost item to the first user. Further, the first user may be unaware that the item is lost or may be unaware of where the first user last had possession of the item. Accordingly, the usage history of the laundry appliance may be useful for identifying the lost item and tracking down the owner of the lost item. Thus, for example, the second user may obtain a photographic image of the lost item, such as with a camera of the second user's remote user interface device, e.g., smartphone, and the image may be received by, e.g., uploaded to, a remote computer device, e.g., the cloud, from the remote user interface device associated with the second user account.

In response to receiving the image of the lost item, method 900 may include a step 950 of sending a notification to the remote user interface device associated with the first user account. For example, the image of the lost item may be received by the same computing device or system of devices, e.g., cloud, that manages the status of the one or more laundry appliances, e.g., a distributed computing system owned or operated by the appliance manufacturer, as described above. Thus, the first user account may be identified, and the notification sent based on the usage history of the laundry appliance, where the first user account may be, for example, the most recent prior user of the laundry appliance and, as such, may be the most likely owner of the lost item.

Figure 10:
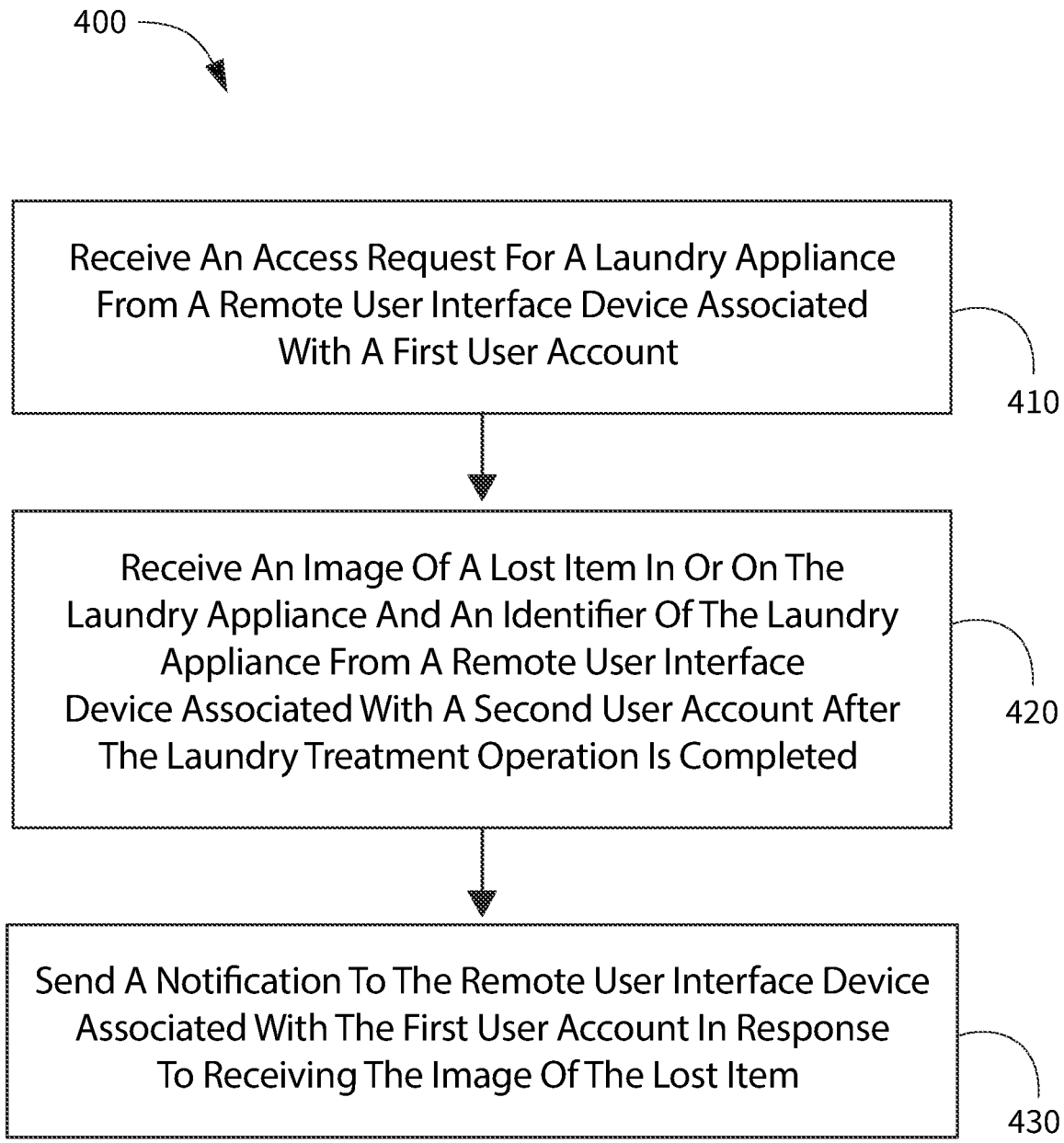
FIG. 10 provides a flowchart illustrating another example method of identifying a lost item from a laundry appliance according to one or more additional embodiments of the present disclosure.

Turning now to FIG. 10, another exemplary method 400 of identifying a lost item from a laundry appliance is illustrated therein. The method 400 may include a step 410 of activating the laundry appliance in response to an input received from a remote user interface device associated with a first user account. As described above with respect to method 900, activating the laundry appliance may include performing a laundry treatment operation. The input may be an access request, e.g., reservation request, an unlocking command, a start command, or other similar input, including combinations of such inputs.

After the laundry treatment operation is completed, method 400 may further include a step 420 of receiving an image of the lost item in or on the laundry appliance and an identifier of the laundry appliance from a remote user interface device associated with a second user account. As described above, the image may be obtained by the second user and uploaded to the remote computing device or system of devices, e.g., cloud, that manages the status of the one or more laundry appliances. The identifier of the laundry appliance may be a serial number, name plate, QR code, or other identifying information for the specific laundry appliance. In some embodiments, the identifier of the laundry appliance may be used to determine one or more recent users of the particular laundry appliance and/or nearby laundry appliance(s).

As illustrated in FIG. 10, method 400 may further include a step 430 of sending a notification to the remote user interface device associated with the first user account in response to receiving the image of the lost item. For example, the first user account may be an immediate prior user of the laundry appliance, e.g., as described above regarding method 900.

Activating the laundry appliance, e.g., in step 930 of method 900 and/or in step 410 of method 400, includes causing at least one mechanical component of the laundry appliance to be operated. For example, the mechanical component may be a motor, such as the motor 122 of the washing machine appliance 10 (FIG. 2) or the motor 31 of the dryer appliance 11 (FIG. 3), a pump, a fan, a heating element, or a compressor, among other possible example mechanical components of a laundry appliance. Also, operating the mechanical component includes changing a physical status of the component, e.g., a speed, position, etc. of the component, such as accelerating the motor, fan, etc., e.g., from a zero starting speed, opening a valve, and/or other changes in the physical state of one or more mechanical components of the laundry appliance.

In some embodiments, methods according to the present disclosure may include unlocking one or more laundry appliances, e.g., unlocking a reserved washing machine appliance and/or a reserved dryer appliance, where such unlocking may be performed via the remote user interface device. In some embodiments, the remote user interface device and the group of laundry appliances may both (or all) be in communication with a remote database, as mentioned above, and the unlocking step for each laundry appliance, e.g., the washing machine appliance and/or dryer appliance, may include receiving identifying information of the laundry appliance with the remote user interface device, transmitting the identifying information to the remote database from the remote user interface device, and unlocking the laundry appliance by the remote database after receiving the identifying information of the laundry appliance. For example, identifying information of the laundry appliance may be encoded in a bar code, such as a QR code. As a further example, the identifying information may include a serial number of the laundry appliance, e.g., which may be recognized in a captured image of the laundry appliance that is captured by the remote user interface device. Thus, unlocking the laundry appliance may include scanning a code on the laundry appliance or taking a picture of the laundry appliance, such as a picture of a nameplate on the laundry appliance.

Referring now generally to FIGS. 9 and 10, the methods 400 and/or 900 may be interrelated and/or may have one or more steps from one of the methods 400 and 900 combined with the other method 400 or 900. Thus, those of ordinary skill in the art will recognize that the various steps of the exemplary methods described herein may be combined in various ways to arrive at additional embodiments within the scope of the present disclosure.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

In some embodiments, one or more methods according to the present disclosure may be computer-implemented, such as implemented at least in part by a remote computing device, e.g., in a distributed computing environment such as the cloud, fog, and/or edge, as mentioned above. Such embodiments may also include one or more steps performed by a remote user interface device which is in communication with the remote computing device, where the remote user interface device and the remote computing device are both remote from the laundry appliances, e.g., as described above with respect to FIG. 4, and are remote from each other.

For example, the notification sent to the remote user device associated with the first user account in exemplary methods according to one or more embodiments of the present disclosure may include an identification prompt for identification of the lost item. For example, the identification prompt may include the image of the lost item (e.g., which was received from the remote user interface device associated with the second user account), a prompt such as "Is this item yours?" and a selectable input of "Yes" or "No." Embodiments which include sending one or more notifications to one or more remote user interface devices, e.g., the remote user interface device associated with the first user account, may include sending the notification(s) to the user from the remote computing device using the remote user interface device, such as a pop-up or prompt on a user interface, e.g., on a display such as a touchscreen of the remote user interface device associated with the respective user account.

In some embodiments, one or more methods according to the present disclosure may include identifying one or more additional recent users of the laundry appliance, and sending a notification to a respective remote user interface device associated with each of the one or more additional recent users of the laundry appliance. The additional recent users may be identified after sending the notification to the remote user interface device associated with the first user account, such as when the response to the identification prompt is negative, e.g., when the selectable input "No" is selected (such as touched on a touchscreen etc.), or may be identified and the additional notifications sent at the same time as sending the notification to the remote user interface device associated with the first user account.

In additional embodiments, one or more recent users of one or more nearby laundry appliances may also be notified, such as in addition to or instead of the additional recent users of the first laundry appliance. The recent users of the one or more nearby laundry appliances may be notified at the same time as or after sending the notification to the remote user interface device associated with the first user account (such as when a negative response to the identification prompt is received from the remote user interface device associated with the first user account). For example, methods according to the present disclosure may include identifying a recent user of a nearby laundry appliance, and sending a notification to a respective remote user interface device associated with the recent user of the nearby laundry appliance. The one or more nearby laundry appliances may be identified by a remote computing device (or devices), e.g., the remote computing device may determine which other laundry appliances of the group of laundry appliances are nearby to the laundry appliance, such as one or more closest laundry appliances to the laundry appliance, e.g., as described above with reference to FIG. 8.

In some embodiments, the nearby laundry appliance(s), e.g., that is or are closest to the first laundry appliance, may be determined based on a floor plan. In such embodiments, the floor plan may include location information of each laundry appliance from the group of laundry appliances. For example, the floor plan may be uploaded to a remote computing device, and the location information of each laundry appliance may be added to the floor plan, either before or after the upload, such as via a user interface including icons which represent locations of washing machine appliances and dryer appliances of the group of laundry appliances within the room represented by the floor plan. For example, the location information may be added to the floor plan after the floor plan is scaled based on the actual dimensions of the room, e.g., whereby the icons representing each laundry appliance may be appropriately proportioned relative to the overall floor plan and to each other, such as with respect to distances between each laundry appliance. The floor plan may be uploaded after the dimensions are entered and the appliance location information is received, or the scaling and locating may be performed, in whole or in part, using the remote computing device after uploading the basic floor plan to the remote computing device.

In some embodiments, methods according to the present disclosure may include receiving, by a remote computing device, an upload comprising a floor plan of a room, e.g., the group of laundry appliances may be located in the room. In such embodiments, the method may include receiving, by the remote computing device, location information for each laundry appliance of the group of laundry appliances, such as from a remote user interface device such as a computer, e.g., tablet computer or desktop computer, etc., or smartphone. Such embodiments may further include receiving, by the remote computing device, dimensions of the room, and scaling the floor plan and the location information for each laundry appliance based on the dimensions, e.g., in such embodiments, the scaling of the floor plan may be performed in the remote computing device, whereas in additional embodiments, the scaling of the floor plan may also or instead be performed by the remote user interface device, such as prior to the upload and/or as a check on the accuracy of the scaling. Also in such embodiments, one or more nearby or adjoining laundry appliances closest to an identified or selected laundry appliance may be determined, e.g., by the remote computing device, based on the floor plan.

In some embodiments, exemplary methods according to the present disclosure may include rewarding the user who found and returned the lost item. For example, the first user (or whichever user is ultimately determined to have been the owner of the lost item, e.g., another recent user of the same laundry appliance or a recent user of another nearby laundry appliance), may be prompted to reward the second user. Thus, for example, in such embodiments, one or more methods may include sending a reward prompt to the remote user interface device associated with the first user account, receiving a positive response to the reward prompt, and applying a credit to the second user account based on the positive response to the reward prompt. The credit to the second user account may be applied, e.g., by the remote computing device(s) which manage the status of the laundry appliances and the user accounts, as described above.

It should be understood that any or all of the foregoing method steps, e.g., of method 400 and/or method 900, may be performed by the remote user interface device, such as in an app running on, e.g., a smartphone or tablet. For example, the app may be used to start one or both of the laundry appliances, such as after or during the unlocking step(s).

Embodiments of the present disclosure include activating a laundry appliance, and, based on the user account which activated the laundry appliance, identifying a returning a lost item that is later found on or in the laundry appliance. As such, it should be recognized that the operation of the laundry appliance is an integral part of the present disclosure for several reasons, such as because it is the fact of such operation (as opposed to, for example, reserving the laundry appliance without actually using it) which helps to identify the likely owner of the lost item.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of identifying a lost item from a laundry appliance, the method comprising:
    receiving an access request for the laundry appliance from a remote user interface device associated with a first user account;
    reserving the laundry appliance in response to the access request;
    activating the laundry appliance after reserving the laundry appliance, wherein activating the laundry appliance comprises performing a laundry treatment operation;
    receiving, after the laundry treatment operation is completed, an image of the lost item in or on the laundry appliance from a remote user interface device associated with a second user account;
    sending a notification to the remote user interface device associated with the first user account in response to receiving the image of the lost item; and
    identifying a recent user of a nearby laundry appliance, and sending a notification to a respective remote user interface device associated with the recent user of the nearby laundry appliance.

2. The method of claim 1, wherein the notification comprises an identification prompt for identification of the lost item.

3. The method of claim 1, further comprising identifying one or more additional recent users of the laundry appliance, and sending a notification to a respective remote user interface device associated with each of the one or more additional recent users of the laundry appliance.

4. The method of claim 1, wherein the laundry appliance and the nearby laundry appliance are members of a group of laundry appliances, wherein the nearby laundry appliance is identified based on a floor plan, the floor plan comprising location information of each laundry appliance from the group of laundry appliances.

5. The method of claim 1, further comprising sending a reward prompt to the remote user interface device associated with the first user account, receiving a positive response to the reward prompt, and applying a credit to the second user account based on the positive response to the reward prompt.

6. The method of claim 1, wherein the notification comprises an identification prompt for identification of the lost item, further comprising receiving a negative response to the identification prompt, and, based on the negative response to the identification prompt, identifying one or more additional recent users of the laundry appliance or a nearby laundry appliance and sending a notification to a respective remote user interface device associated with each of the one or more identified additional recent users.

7. The method of claim 1, further comprising identifying a recent user of a nearby laundry appliance, and sending a notification to a respective remote user interface device associated with the recent user of the nearby laundry appliance, wherein the laundry appliance and the nearby laundry appliance are members of a group of laundry appliances, further comprising receiving, by a remote computing device, an upload comprising a floor plan of a room, the group of laundry appliances located in the room, and receiving, by the remote computing device, location information for each laundry appliance of the group of laundry appliances.

8. The method of claim 7, further comprising receiving, by the remote computing device, dimensions of the room, and scaling the floor plan and the location information for each laundry appliance based on the dimensions.

9. A method of identifying a lost item from a laundry appliance, the method comprising:
    activating the laundry appliance in response to an input received from a remote user interface device associated with a first user account, wherein activating the laundry appliance comprises performing a laundry treatment operation;
    receiving, after the laundry treatment operation is completed, an image of the lost item in or on the laundry appliance and an identifier of the laundry appliance from a remote user interface device associated with a second user account;
    sending a notification to the remote user interface device associated with the first user account in response to receiving the image of the lost item; and
    sending a reward prompt to the remote user interface device associated with the first user account, receiving a positive response to the reward prompt, and applying a credit to the second user account based on the positive response to the reward prompt.

10. The method of claim 9, wherein the notification comprises an identification prompt for identification of the lost item.

11. The method of claim 9, further comprising identifying one or more additional recent users of the laundry appliance, and sending a notification to a respective remote user interface device associated with each of the one or more additional recent users of the laundry appliance.

12. The method of claim 9, further comprising identifying a recent user of a nearby laundry appliance, and sending a notification to a respective remote user interface device associated with the recent user of the nearby laundry appliance.

13. The method of claim 12, wherein the laundry appliance and the nearby laundry appliance are members of a group of laundry appliances, wherein the nearby laundry appliance is identified based on a floor plan, the floor plan comprising location information of each laundry appliance from the group of laundry appliances.

14. The method of claim 9, wherein the notification comprises an identification prompt for identification of the lost item, further comprising receiving a negative response to the identification prompt, and, based on the negative response to the identification prompt, identifying one or more additional recent users of the laundry appliance or a nearby laundry appliance and sending a notification to a respective remote user interface device associated with each of the one or more identified additional recent users.

15. The method of claim 9, further comprising identifying a recent user of a nearby laundry appliance, and sending a notification to a respective remote user interface device associated with the recent user of the nearby laundry appliance, wherein the laundry appliance and the nearby laundry appliance are members of a group of laundry appliances, further comprising receiving, by a remote computing device, an upload comprising a floor plan of a room, the group of laundry appliances located in the room, and receiving, by the remote computing device, location information for each laundry appliance of the group of laundry appliances.

16. The method of claim 15, further comprising receiving, by the remote computing device, dimensions of the room, and scaling the floor plan and the location information for each laundry appliance based on the dimensions.

17. A method of identifying a lost item from a laundry appliance, the method comprising:
    activating the laundry appliance in response to an input received from a remote user interface device associated with a first user account, wherein activating the laundry appliance comprises performing a laundry treatment operation;
    receiving, after the laundry treatment operation is completed, an image of the lost item in or on the laundry appliance and an identifier of the laundry appliance from a remote user interface device associated with a second user account;
    sending a notification to the remote user interface device associated with the first user account in response to receiving the image of the lost item;
    identifying a recent user of a nearby laundry appliance;
    sending a notification to a respective remote user interface device associated with the recent user of the nearby laundry appliance, wherein the laundry appliance and the nearby laundry appliance are members of a group of laundry appliances;
    receiving, by a remote computing device, an upload comprising a floor plan of a room, the group of laundry appliances located in the room; and
    receiving, by the remote computing device, location information for each laundry appliance of the group of laundry appliances.

18. The method of claim 17, further comprising receiving, by the remote computing device, dimensions of the room, and scaling the floor plan and the location information for each laundry appliance based on the dimensions.

19. The method of claim 17, wherein the notification comprises an identification prompt for identification of the lost item.

20. The method of claim 17, further comprising identifying one or more additional recent users of the laundry appliance, and sending a notification to a respective remote user interface device associated with each of the one or more additional recent users of the laundry appliance.

* * * * *